United States Patent Office 2,995,195
Patented Aug. 8, 1961

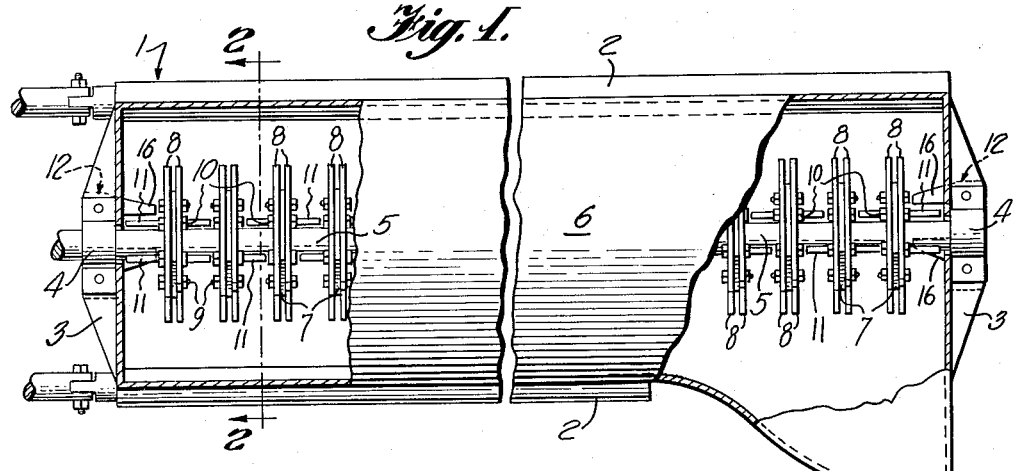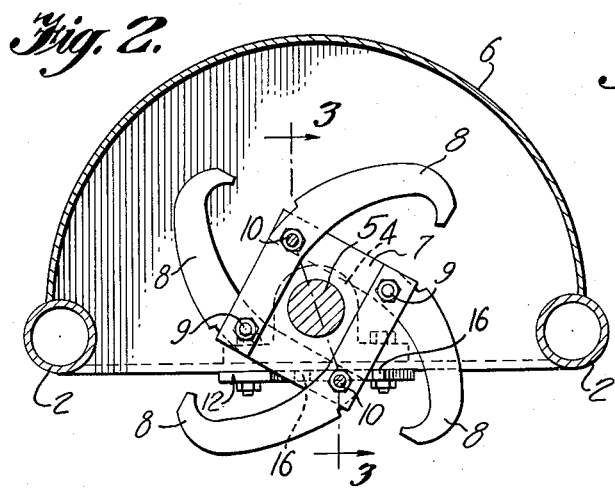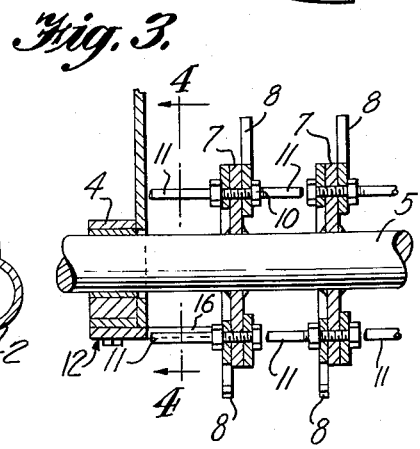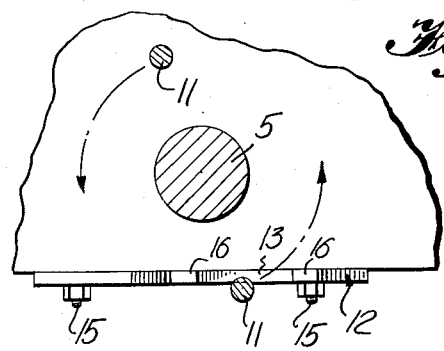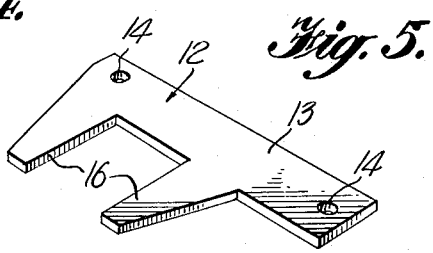

2,995,195
ANTI-FOULING ROTARY CULTIVATOR
Harold D. Maguire, 135 Wall St., Orlando, Fla.
Filed Feb. 25, 1959, Ser. No. 795,464
3 Claims. (Cl. 172—556)

This invention relates to rotary hoes of the type wherein a plurality of hoe elements are mounted in spaced relation along a shaft for rotation with the shaft, and more particularly to hoes of this character having means to prevent weeds or other material from wrapping around the shaft.

In using agricultural equipment which includes a rotary shaft located relatively close to ground level, considerable difficulty is encountered due to the fact that weeds and other growth will frequently become caught in the equipment and wrap around the shaft. As this builds up it interferes with the operation of the hoes, and, if it is adjacent the shaft bearings, will seriously interfere with the free rotation of the shaft, cause heating of the shaft and bearings and, if not cleared, may ultimately prevent rotation of the shaft. Many efforts have been made to provide structure which would prevent this from occurring, but no simple, effective way of overcoming the difficulty has previously been devised.

It is the object of the present invention to provide a rotary hoe having extremely simple means for preventing wrap around at any place along the length of the hoe shaft.

It is another object to provide means adjacent the shaft ends, at the bearings, to break any weeds, vines, etc. which might tend to be carried around the shaft so that the bearing area will be free of obstruction at all times.

It is a further object to provide the above advantages, in part at least, by means which are used in assembling the hoe.

Yet another object is to achieve the desired results by means which sweep in an orbit about the shaft to brush away weeds, etc. which might tend to wrap around the shaft.

Other objects of the invention will become apparent from the following description of one practical embodiment thereof, when taken with the drawings which accompany, and form part of, this specification.

In the drawings:

FIGURE 1 is a top plan view of a rotary hoe incorporating the principles of the present invention, parts of the hood being broken away so that the interior structure can be seen;

FIGURE 2 is a vertical, transverse section, taken on the line 2—2 of FIGURE 1;

FIGURE 3 is a fragmentary longitudinal section through the structure and is taken substantially on the line 3—3 of FIGURE 2;

FIGURE 4 is a partial vertical, transverse section taken on the line 4—4 of FIGURE 3, adjacent one bearing of the shaft, illustrating the path of movement of the weed breaking as chopping elements relative to the shaft and a fixed breaker bar; and FIGURE 5 is a perspective view of the fixed breaker bar to be used adjacent a bearing.

In general, the invention comprises elements carried by the hoe structure and adapted to move in an orbit about the shaft as the shaft rotates to brush weeds and vines from the shaft path of travel and to effectively increase the shaft diameter to decrease the possibility of the weeds engaging and winding on the shaft. The invention also contemplates the use of fixed members at the shaft bearings to cooperate with the rotating elements to chop, or break up, the weeds in the bearing areas.

Referring to the drawings in detail, there is shown a rotary hoe structure which includes a frame 1 composed of spaced, parallel side rails 2 bridged at the ends by cross-bars 3. The cross-bars support bearings 4 which, in turn, support and journal a hoe shaft 5. The shaft may be driven in any suitable manner. It is customary to mount an arched hood 6 on the frame to house the upper part of the hoe structure.

The hoe, or cultivator, elements are mounted upon plates 7 which are secured to the shaft 5 at spaced points along the shaft. The hoe elements are shown as curved arms 8 bolted to the plates by means of bolts 9 and 10. As shown, there are four hoes attached to each plate, two on one side and two on the other. Each of the bolts 9 and 10 passes through two of the hoe elements and the mounting plate to which they are attached.

In accordance with the teaching of the present invention, two of the bolts through each plate will be considerably longer than the others and will project beyond the plate a considerable distance, to bridge the greater part of the gap between adjacent plates. These longer bolts are shown at 10, with the projecting rod-like, anti-fouling portions being indicated at 11. It will be noted that the longer bolts are diametrically opposed at each plate and that the bolts at each plate are inserted so that they project in opposite directions. Thus, there will be one anti-fouling, rod-like element 11 projecting from one plate toward an adjacent plate and a second anti-fouling rod-like element projecting from the adjacent plate toward the first plate, with the two elements being on opposite sides of the shaft. This arrangement provides for complete bridging of the space between adjacent plates, and an anti-fouling element for effective operation each half revolution of the shaft. The elements 11 are located a sufficient distance from the axis of the shaft so that their orbit of revolution will form a cylinder of substantially increased diameter over that of the shaft. For this reason, the elements will knock down weeds, or vines, an appreciable distance from the shaft.

The projecting elements 11 on the end plates extend close to the shaft bearings 4. In order to preclude any possibility of weeds winding about the shaft adjacent the bearings, breaker bars 12 are provided. These are flat bars 13, having openings 14 to receive the bolts 15 which secure the bearings in place, and a pair of spaced projecting legs 16. The legs are located on the bar so that when the bar is secured at the bearing position by the bearing bolts, they will project toward the end plate of the shaft and lie on opposite sides of the path travelled by the anti-fouling elements 11. Thus, the end elements 11 when moving along their orbital paths will pass between the legs of the bar. This will cause weeds, vines, etc. which span the legs to be chopped or severed to prevent winding around the shaft. As any weed tending to wrap around the shaft at the bearing will have to lie across the legs 16, the weed can only make a half turn about the shaft before the anti-fouling rod 11 will sever it. This will keep the shaft and bearings free at all times.

The above described structure will keep the shaft free from entanglement from end to end and provide the extra precaution of chopping away weeds tending to wrap around the shaft at the bearings.

While in the above one practical embodiment of the invention has been disclosed, it will be understood that the precise details of construction described and shown are merely by way of example and the invention may take other forms within the scope of the appended claims.

What is claimed is:

1. In a cultivator having a frame with a rotary shaft journalled in bearings on the frame, cultivator element-supporting members carried by the shaft at spaced positions therealong between the bearings, and cultivators secured to the supporting members, the improvement which comprises, means securing the cultivators to the supporting members having elongated anti-fouling elements projecting therefrom parallel to the rotary shaft and spaced therefrom, there being at least two such anti-fouling elements projecting from each supporting member, with the anti-fouling elements on each supporting member projecting in opposite directions from the supporting member toward and terminating short of the next adjacent supporting members, the anti-fouling elements of adjacent supporting members being of sufficient length to overlap one another and being arranged on opposite sides of the rotary shaft, whereby the anti-fouling elements will move in an orbit around the shaft as the shaft rotates to prevent weeds and vines from winding about the shaft.

2. A cultivator as claimed in claim 1 wherein there is a breaker bar mounted on the frame adjacent each bearing and having a pair of spaced legs projecting toward an adjacent supporting member, said legs lying on opposite sides of the orbital path of movement of the anti-fouling element carried by the adjacent supporting element, whereby weeds and vines overlying the legs will be chopped and broken by the passage of the element between the legs.

3. In a cultivator having a frame with a rotary shaft journalled in bearings on the frame, cultivator-supporting members carried by the shaft at spaced positions therealong between the bearings, and cultivators secured to the supporting members, the improvement which comprises, anti-fouling elements mounted on the end supporting members and extending toward said bearings, the anti-fouling elements lying parallel to the shaft and being spaced therefrom, whereby the elements will move in an orbit around the shaft as the shaft is rotated, a breaker bar mounted upon the shaft adjacent each bearing and having a pair of spaced legs projecting toward the respective end supporting members, said legs lying on opposite sides of the orbital path of movement of the said anti-fouling elements, whereby weeds and vines overlying the legs will be chopped and broken by passage of said elements between the legs.

References Cited in the file of this patent

UNITED STATES PATENTS

| | | |
|---|---|---|
| 296,096 | Niles | Dec. 12, 1882 |
| 321,906 | McCormick | July 7, 1885 |
| 1,207,792 | Quellennec | Dec. 12, 1916 |
| 2,040,068 | Ziegler | May 5, 1936 |
| 2,590,790 | Pettman | Mar. 25, 1952 |
| 2,765,719 | Day et al. | Oct. 6, 1956 |